United States Patent
Yoshida et al.

(10) Patent No.: US 9,596,129 B2
(45) Date of Patent: Mar. 14, 2017

(54) COMMUNICATION SYSTEM, CONTROL APPARATUS, COMMUNICATION APPARATUS, INFORMATION-RELAYING METHOD, AND PROGRAM

(71) Applicants: Hirokazu Yoshida, Tokyo (JP); Masanori Takashima, Tokyo (JP)

(72) Inventors: Hirokazu Yoshida, Tokyo (JP); Masanori Takashima, Tokyo (JP)

(73) Assignee: NEC CORPORATION, Tokyo (JP)

(*) Notice: Subject to any disclaimer, the term of this patent is extended or adjusted under 35 U.S.C. 154(b) by 71 days.

(21) Appl. No.: 14/379,991

(22) PCT Filed: Mar. 18, 2013

(86) PCT No.: PCT/JP2013/057609
§ 371 (c)(1),
(2) Date: Aug. 20, 2014

(87) PCT Pub. No.: WO2013/141193
PCT Pub. Date: Sep. 26, 2013

(65) Prior Publication Data
US 2015/0009798 A1    Jan. 8, 2015

(30) Foreign Application Priority Data
Mar. 19, 2012  (JP) ................. 2012-062222

(51) Int. Cl.
*H04L 12/24* (2006.01)
*H04Q 3/66* (2006.01)
(Continued)

(52) U.S. Cl.
CPC .......... *H04L 41/0654* (2013.01); *H04L 45/00* (2013.01); *H04Q 3/66* (2013.01);
(Continued)

(58) Field of Classification Search
CPC .................................. H04L 41/0654
See application file for complete search history.

(56) References Cited

U.S. PATENT DOCUMENTS

| | | | |
|---|---|---|---|
| 6,091,734 A | 7/2000 | Suzuki et al. | |
| 2008/0068985 A1* | 3/2008 | Mieno | H04L 12/66 370/217 |

(Continued)

FOREIGN PATENT DOCUMENTS

| | | |
|---|---|---|
| EP | 0 831 670 A1 | 3/1998 |
| JP | 10-98524 A | 4/1998 |

(Continued)

OTHER PUBLICATIONS

Extended European Search Report dated Oct. 30, 2015.
(Continued)

*Primary Examiner* — John Blanton
(74) *Attorney, Agent, or Firm* — McGinn IP Law Group, PLLC

(57) ABSTRACT

A communication system includes a communication apparatus that processes a packet according to control information set by a control apparatus; a first control apparatus that controls the communication apparatus by setting the control information in the communication apparatus; and a second control apparatus that operates in concert with the first control apparatus. The first control apparatus transmits information necessary for interoperation between the first and second control apparatuses to the second control apparatus via the communication apparatus.

20 Claims, 13 Drawing Sheets

(51) Int. Cl.
H04L 12/701 (2013.01)
H04L 12/717 (2013.01)

(52) U.S. Cl.
CPC .... *H04L 45/42* (2013.01); *H04Q 2213/13145* (2013.01); *H04Q 2213/13166* (2013.01); *H04Q 2213/13167* (2013.01); *H04Q 2213/13178* (2013.01)

(56) References Cited

U.S. PATENT DOCUMENTS

| | | | |
|---|---|---|---|
| 2008/0091746 A1* | 4/2008 | Hatasaki | G06F 11/2033 |
| 2008/0189769 A1 | 8/2008 | Casado et al. | |
| 2008/0219273 A1 | 9/2008 | Kaneko | |
| 2010/0020680 A1* | 1/2010 | Salam | H04L 43/0811 370/225 |

FOREIGN PATENT DOCUMENTS

| | | |
|---|---|---|
| JP | 2011-166704 A | 8/2011 |
| KR | 10-2006-0043201 A | 5/2006 |
| KR | 10-2008-0019079 A | 3/2008 |
| RU | 2 422 888 C2 | 6/2011 |
| WO | WO 2008/030206 A1 | 3/2008 |
| WO | WO 2008/095010 A1 | 8/2008 |
| WO | WO 2010/084801 A1 | 7/2010 |
| WO | WO 2011/122166 A1 | 10/2011 |

OTHER PUBLICATIONS

Kentaro Ogawa et al: "Fault Management in Functionally Distributed Transport Networking for Large Scale Networks", Intelligent Networking and Collaborative Systems, 2009. INCOS '09. International Conference on, IEEE, Piscataway, NJ, USA, Nov. 4, 2009 (Nov. 4, 2009), pp. 378-382, XP031593131.
Korean Office Action dated Oct. 22, 2015 with a partial English Translation thereof.
Korean Office Action dated Apr. 26, 2016 with an English translation.
Russian Decision on Grant dated Dec. 7, 2015 with an English translation.
International Search Report dated May 7, 2013 in International Patent Application Publication No. PCT/JP2013/057609.
Nick McKeowa, et. al. "OpenFlow: Enabling Innovation in Campus Networks," [online], [searched on Feb. 14, 2012], the Internet <URL: http://www.openflow.org/documents/openflow-wp-latest.pdf>.
OpenFlow Switch Specification Version 1.1.0 Implemented (Wire Protocol 0x02), [online], [searched on Feb. 14, 2012], the Internet <URL:http://www.openflow.org/documents/openflow-spec-v1.1.0.pdf >.
"OpenFlow Switch Specification" Version 1.0.0 Implemented (Wire Protocol 0x01), [online], [searched on Feb. 14, 2012], the Internet <URL:http://www.openflow.org/documents/openflow-spec-v1.1.0.pdf >.
Adrian S.-W. Tam et al., "Scalability and Resilience in Data Center Networks: Dynamic Flow Reroute as an Example", 2011 IEEE Global Telecommunications Conference—GLOBECOM 2011, [online], Dec. 2011, IEEE, [retrieval date Apr. 22, 2013], internet<URL: http://ieeexplore.ieee.org/xpls/abs_all.jsp?arnumber=6134068>.
Kentaro Ogawa et al., "Fault Management in Functionally Distributed Transport Networking for Large Scale Networks", The International Conference on Intelligent Networking and Collaborative Systems, INCoS 2009, pp. 378-382, [online], Nov. 2009, IEEE Computer Society, [retrieval date Apr. 22, 2013 (Apr. 22, 2013)], internet <URL:http://ieeexplore.ieee.org/xpls/ absall.jsp?arnumber=5369336>.
Keisuke Torigoe et al., "Redundancy system of Controllers using In-band Channel", 2010 Nen The Institute of Electronics, Information and Communication Engineers Sogo Taikai Koen Ronbunshu Tsushin 2, Mar. 2, 2010, p. 40.
Chinese Office Action dated Aug. 2, 2016 and an English Translation thereof.

* cited by examiner

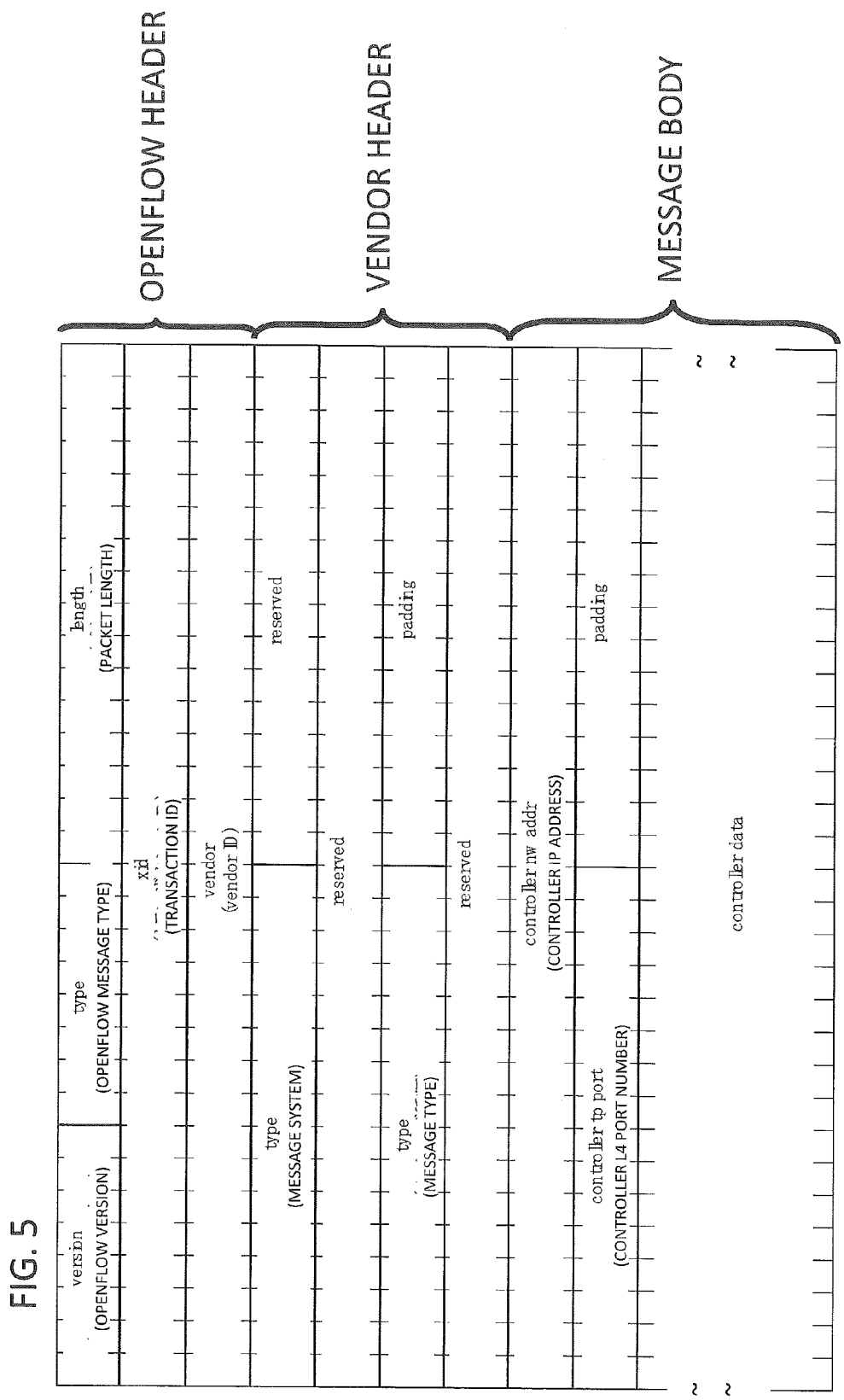

FIG. 6

| FIELD NAME | | CONTENT |
|---|---|---|
| OPENFLOW HEADER | Version | BASED ON THE OPENFLOW PROTOCOL |
| | Type | BASED ON THE OPENFLOW PROTOCOL |
| | Length | BASED ON THE OPENFLOW PROTOCOL |
| | Xid | BASED ON THE OPENFLOW PROTOCOL |
| | Vendor | BASED ON THE OPENFLOW PROTOCOL |
| VENDOR HEADER | Type1 | USED AS A MESSAGE SYSTEM |
| | Type2 | USED AS A MESSAGE IDENTIFIER |
| MESSAGE BODY | controller nw addr | SOURCE CONTROLLER IP ADDRESS |
| | controller tp port | SOURCE CONTROLLER L4 PORT NUMBER |
| | controller data | SYNCHRONIZATION MESSAGE CONTENT |

COMMUNICATION SYSTEM, CONTROL APPARATUS, COMMUNICATION APPARATUS, INFORMATION-RELAYING METHOD, AND PROGRAM

TECHNICAL FIELD

Description of Related Application

The present invention is based upon and claims the benefit of the priority of Japanese patent application No. 2012-062222 filed on Mar. 19, 2012, the disclosure of which is incorporated herein in its entirety by reference thereto.

The present invention relates to a communication system, control apparatus, communication apparatus, information-relaying method, and program, and particularly to a communication system, control apparatus, communication apparatus, information-relaying method, and program in which control apparatuses that control a communication apparatus are provided.

BACKGROUND

In recent years, a technology called OpenFlow has been proposed (refer to Patent Literatures 1 and 2, and Non-Patent Literatures 1 to 3). OpenFlow treats communication as an end-to-end flow, and performs path control, failure recovery, load balancing, and optimization for each flow. An OpenFlow switch that functions as a relay device comprises a secure channel for communicating with an OpenFlow controller, a control device, and operates according to a flow table suitably added or rewritten by the OpenFlow controller. In the flow table, a set of matching rules (Header Fields) matching a packet header, flow statistics (Counters), and Instructions defining the content of processing applied to a packet matching a matching rule (Header Field) is defined for each flow (refer to the section of "4.1 Flow Table" in Non-Patent Literature 2).

For instance, upon receiving a packet, the OpenFlow switch searches for an entry having a matching rule that matches the header information of the received packet in the flow table. When an entry matching the received packet is found as a result of the search, the OpenFlow switch updates the flow statistics (Counter) and performs the processing content (packet transmission from a designated port, flooding, discard, etc.) written in the action field of the entry on the received packet. Meanwhile, when no entry matching the received packet is found as a result of the search, the OpenFlow switch forwards the received packet to the OpenFlow controller via the secure channel, requests the OpenFlow controller to determine the path of the packet based on the source and the destination of the received packet, and updates the flow table after receiving a flow entry realizing this operation. As described, the OpenFlow switch forwards packets using entries stored in the flow table as processing rules.

Patent Literature 2 proposes a method that sets path information for all network (NW) devices utilizing packets, to which a list of path information (entries in the flow table set by the OpenFlow switch) is added, without having controllers communicate with each other in an environment where a network (NW) device and an incompatible network (NW) device coexist. Patent Literature 1, in Paragraph 0029 and below, introduces a configuration in which the OpenFlow is applied to a large-scale network such as a data center, and a plurality of controllers share the responsibilities of managing all network (NW) devices (refer to FIG. 4 as well).

Patent Literature 1
International Publication Number WO2008/095010
Patent Literature 2
Japanese Patent Kokai Publication No. JP-P2011-166704A
[Non-Patent Literature 1]
Nick McKeown, et. al. "OpenFlow: Enabling Innovation in Campus Networks," [online], [searched on Feb. 14, 2012], the Internet <URL: http://www.openflow.org/documents/openflow-wp-latest.pdf
[Non-Patent Literature 2]
"OpenFlow Switch Specification" Version 1.1.0 Implemented (Wire Protocol 0x02), [online], [searched on Feb. 14, 2012], the Internet <URL: http://www.openflow.org/documents/openflow-spec-v1.1.0.pdf>
[Non-Patent Literature 3]
"OpenFlow Switch Specification" Version 1.0.0 Implemented (Wire Protocol 0x01), [online], [searched on Feb. 14, 2012], the Internet <URL: http://www.openflow.org/documents/openflow-spec-v1.1.0.pdf>

SUMMARY

The following analysis is given by the present invention. In a case where a plurality of OpenFlow controllers (referred to as "OFC" hereinafter) manage an OpenFlow switch (referred to as "OFS" hereinafter) as in Patent Literature 2, the OFCs must be synchronized with each other as discussed in Paragraph 0035 in Patent Literature 2. Patent Literature 2 describes synchronization performed by responding to update instructions of the flow table, but in addition to this, the OFCs must be synchronized by exchanging status information indicating the operating status of own apparatus in a configuration in which a plurality of active and standby OFCs operate.

However, when a failure occurs in the network between the OFCs and the communication is disconnected, the OFCs cannot exchange information with each other and cannot be synchronized.

In this regard, Patent Literature 2 only describes that path information is forwarded to NW devices in subsequent stages via a particular NW device (corresponding to an OFS) or controller, and does not discuss the possibility of a network failure between the controllers. Further, what is exchanged without having the controllers communicate with each other in Patent Literature 2 is a part of instructions to set path information.

It is an object of the present invention to provide a communication system, control apparatus, communication apparatus, information-relaying method, and program providing communication means for exchanging information needed for interoperation between a plurality of control apparatuses.

Solution to Problem

According to a first aspect, there is provided a communication system including a communication apparatus that processes a packet according to control information set by a control apparatus, a first control apparatus that controls the communication apparatus by setting the control information in the communication apparatus, and a second control apparatus that operates in concert with the first control apparatus; and the first control apparatus transmits information necessary for interoperation between the first and second control apparatuses to the second control apparatus via the communication apparatus.

According to a second aspect, there is provided a first control apparatus connected to a network including a communication apparatus that processes a packet according to control information set by a control apparatus and comprising a control unit controlling the communication apparatus by setting the control information in the communication apparatus, and an information transmission unit transmitting information necessary for interoperation with a second control apparatus to the second control apparatus that operates in concert therewith via the communication apparatus.

According to a third aspect, there is provided a second control apparatus connected to a network including a communication apparatus that processes a packet according to control information set by a control apparatus, and a first control apparatus that controls the communication apparatus by setting the control information in the communication apparatus; and the second control apparatus comprises a control unit controlling the communication apparatus by setting the control information in the communication apparatus and an information receiving unit receiving information necessary for interoperation with the first control apparatus from the first control apparatus via the communication apparatus, and operates in concert with the first control apparatus.

According to a fourth aspect, there is provided a communication apparatus comprising a first unit receiving information necessary for interoperation between a plurality of control apparatuses from a control apparatus out of the plurality of control apparatuses that control the communication apparatus by setting the control information in the communication apparatus, and a second unit transmitting information necessary for interoperation between the plurality of control apparatuses to the remaining control apparatuses of the plurality of control apparatuses.

According to a fifth aspect, there is provided an information-relaying method in a network including a communication apparatus that processes a packet according to control information set by a control apparatus, a first control apparatus that controls the communication apparatus by setting the control information in the communication apparatus, and a second control apparatus that operates in concert with the first control apparatus; and the information-relaying method includes having the communication apparatus receive information necessary for interoperation between the first and second control apparatuses from the first control apparatus and having the communication apparatus forward the information necessary for interoperation between the first and second control apparatuses to the second control apparatus. The present method is tied to a particular machine, which is the communication apparatus that processes a packet according to control information set by a control apparatus.

According to a sixth aspect, there is provided a computer program that realizes the functions of the first and second control apparatuses and the communication apparatus. Further, this program can be stored in a computer-readable (non-transient) storage medium. In other words, the present invention can be realized as a computer program product.

The meritorious effects of the present invention are summarized as follows. According to the present invention, there is provided means for exchanging information necessary for interoperation between a plurality of control apparatuses.

BRIEF DESCRIPTION OF THE DRAWINGS

FIG. 5 is a drawing showing the configuration of a synchronization message exchanged between an OFC and OFS of the first exemplary embodiment of the present disclosure.

FIG. 6 is a drawing for explaining the content of each field in the synchronization message in FIG. 5.

PREFERRED MODES

Figure 1:
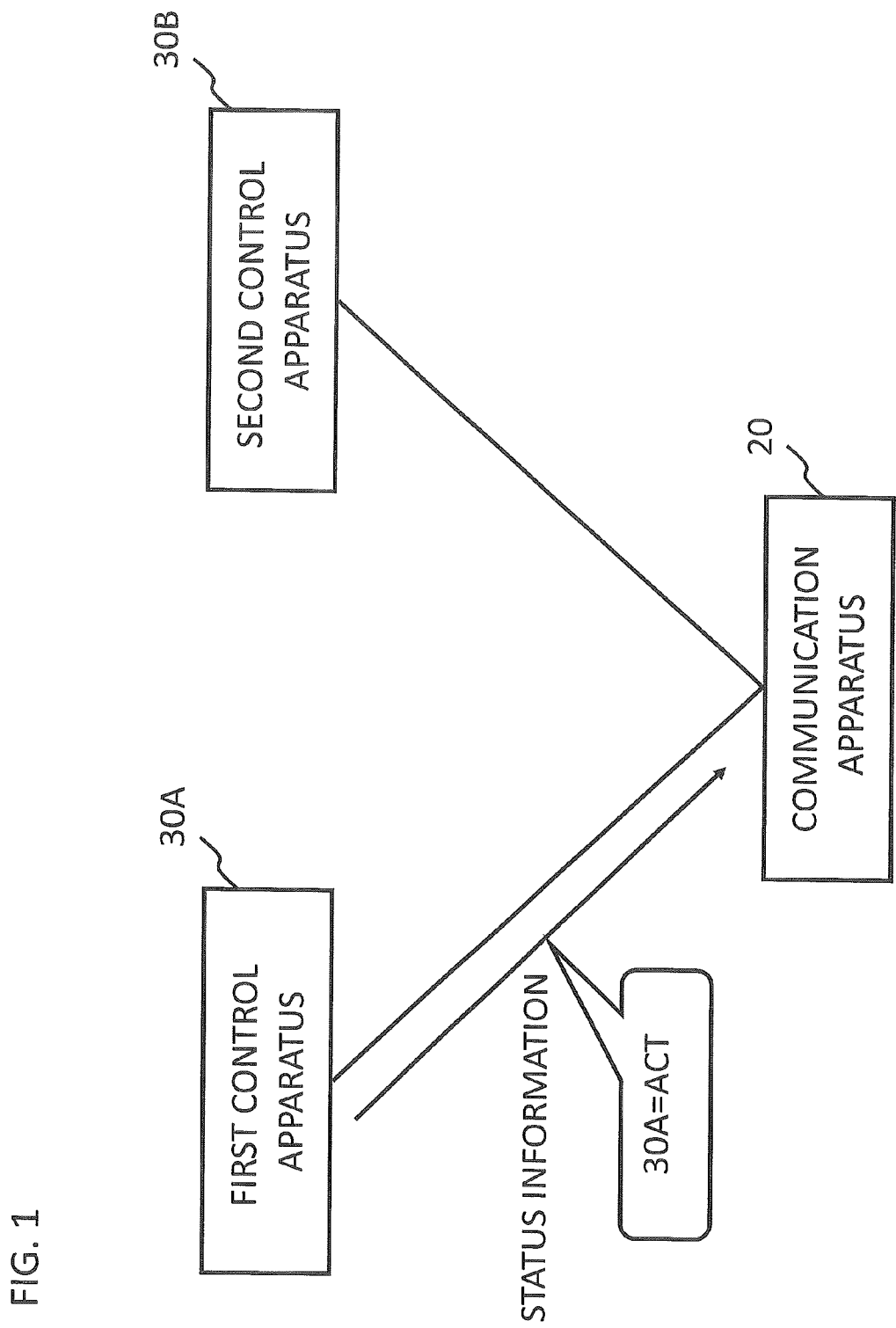
FIG. 1 is a drawing for explaining an exemplary embodiment of the present disclosure.

First, a summary of an exemplary embodiment of the present disclosure will be given with reference to the drawings. Note that drawing reference signs in the summary are given to each element for convenience as examples solely for facilitating understanding and the present disclosure is not limited to the exemplary embodiments shown in the drawings.

As shown in FIG. 1, the present disclosure can be realized in an exemplary embodiment thereof by a configuration including first and second control apparatuses 30A and 30B that operate in concert with each other, and a communication apparatus 20 that processes a packet according to control information set by the first control apparatus 30A or the second control apparatus 30B.

More concretely, the first control apparatus 30A transmits information necessary for the interoperation between the first and second control apparatuses to the communication apparatus 20. The information necessary for the interoperation between the first and second control apparatuses may be the set status of information for controlling communication apparatuses or OFSs under management as in Patent Literature 2, or for instance status information ("30A=ACT" in FIG. 1) indicating that the first control apparatus is active and operating as shown in FIG. 1.

Figure 2:
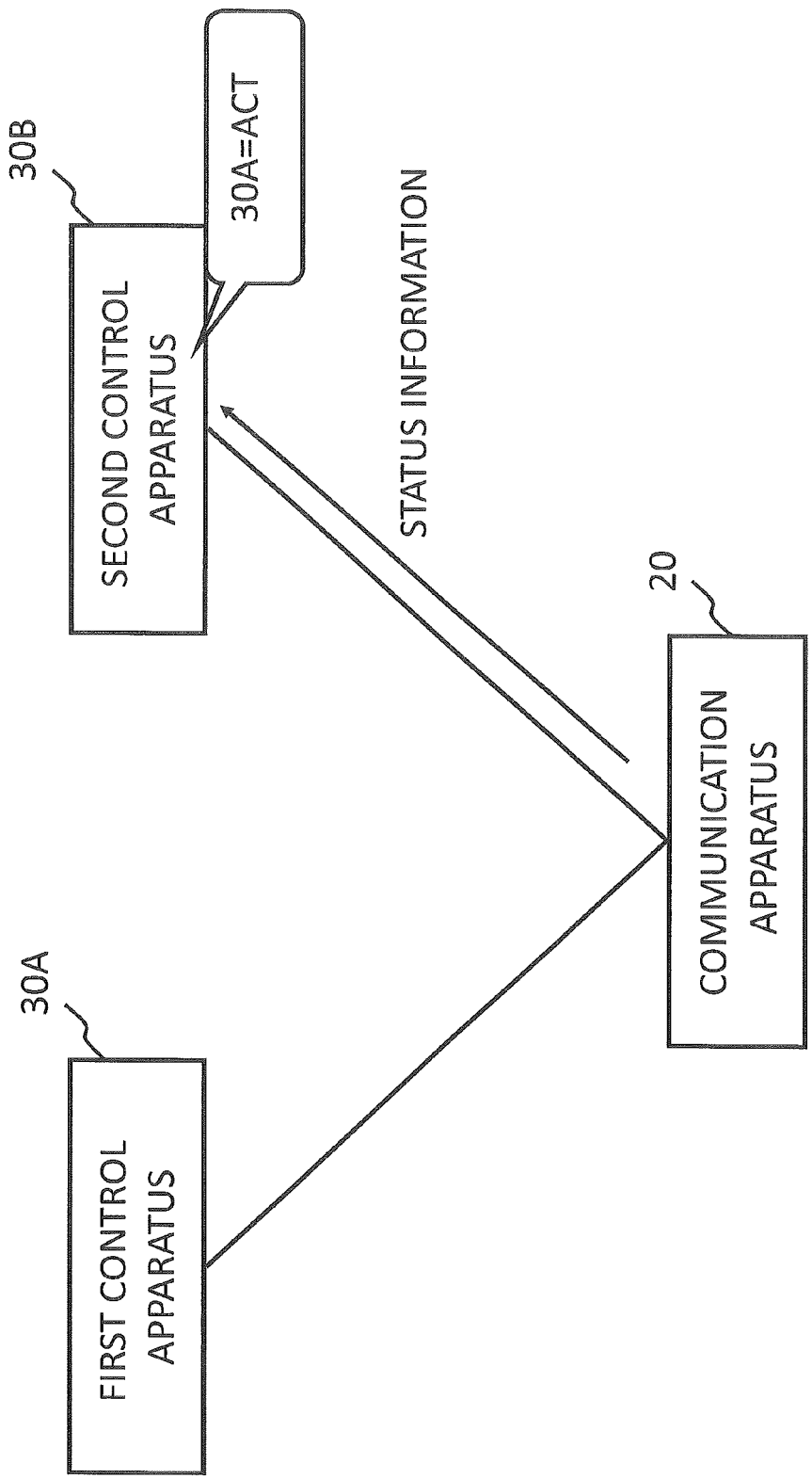
FIG. 2 is a drawing for explaining an exemplary embodiment of the present disclosure.

Then, as shown in FIG. 2, the communication apparatus 20 forwards the information necessary for the interoperation between the first and second control apparatuses to the second control apparatus 30B. The second control apparatus 30B performs processing based on the received information necessary for the interoperation between the first and second control apparatuses. For instance, when receiving the set status of control information for communication apparatuses and OFSs under management, the second control apparatus 30B updates the set status of the control information for communication apparatuses and OFSs on the side thereof and synchronize it. Further, for instance, when receiving the status information ("30A=ACT" in FIG. 1), the second control apparatus 30B updates the status information of the first control apparatus 30A held on the side thereof.

As described, without having the first and the second control apparatuses 30A and 30B directly exchange data, it is possible to exchange the information necessary for the interoperation therebetween. The reason is that the information necessary for the interoperation is relayed via a communication apparatus to be controlled. Further, as the protocol in which the first control apparatus 30A instructs the communication apparatus 20 to transmit the information, this can be achieved by using a Packet-Out message of the OpenFlow protocol described in Non-Patent Literature 2 or a Vendor-defined message described in Non-Patent Literature 3.

Exemplary Embodiment 1

Figure 3:
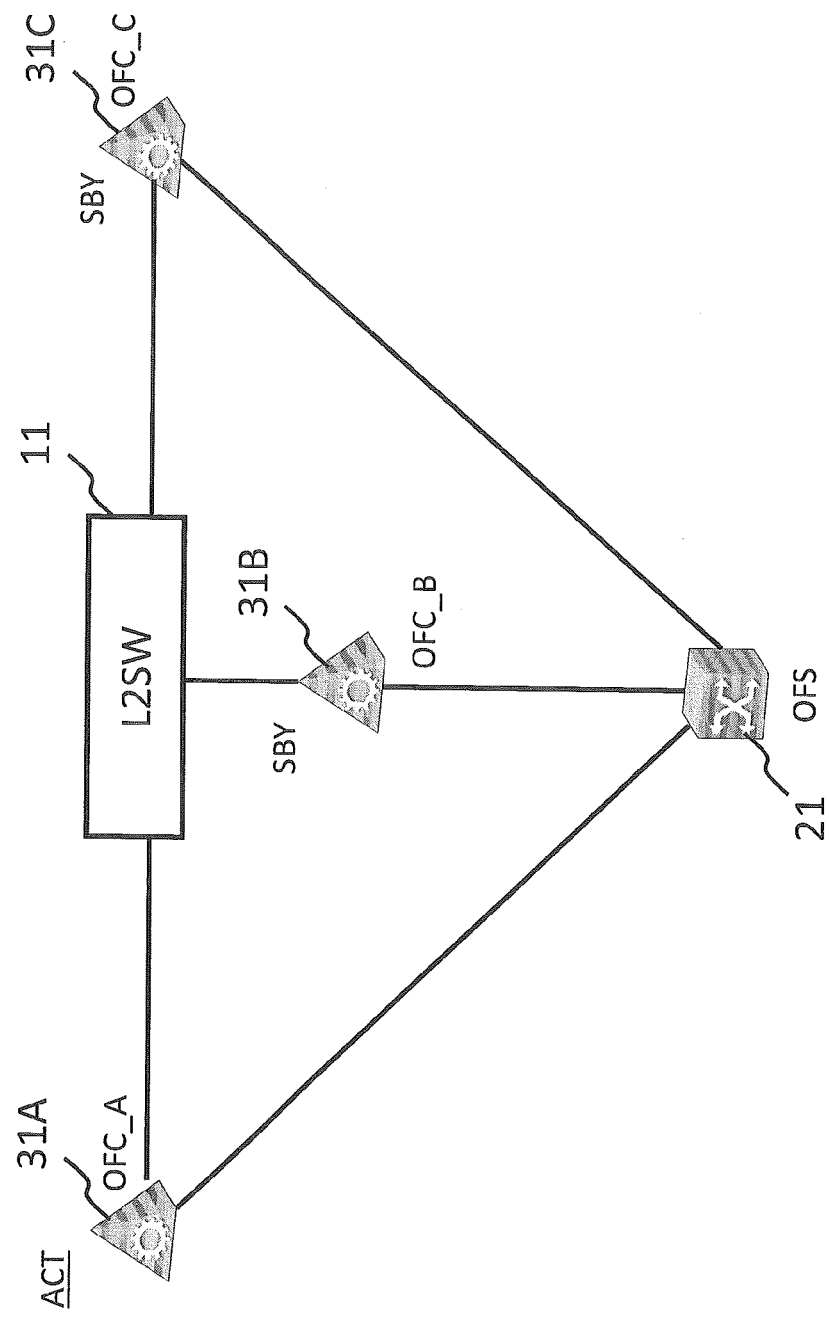
FIG. 3 is a drawing showing the configuration of a communication system of a first exemplary embodiment of the present disclosure.

Next, a first exemplary embodiment of the present disclosure applied to state synchronization between a plurality of OFCs will be described in detail with reference to the drawings. FIG. 3 is a drawing showing the configuration of a communication system of the first exemplary embodiment of the present disclosure. FIG. 3 shows three OFCs (OFC_A, OFC_B, and OFC_C) 31A to 31C that operate in concert with each other and an OFS 21 controlled by an active OFC out of the OFCs 31A to 31C.

Any one of the OFC_A 31A, OFC_B 31B, and OFC_C 31C operates as an active (ACT) OFC and controls the OFS 21. Further, the other OFCs stand by as standbys (SBY). Further, the OFC_A 31A, OFC_B 31B, and OFC_C 31C are connected to a management network via a layer 2 switch (L2SW) 11. The OFC_A 31A, OFC_B 31B, and OFC_C 31C exchange synchronization messages and other control messages with the other OFCs via the management network. Furthermore, when a failure occurs in the management network, the OFC_A 31A, OFC_B 31B, and OFC_C 31C exchange synchronization messages and other control messages with the other OFCs via the OFS 21. In the example in FIG. 3, the OFC_A 31A operates as an active OFC (ACT) and the OFC_B 31B and the OFC_C 31C stand by (SBY).

Figure 4:
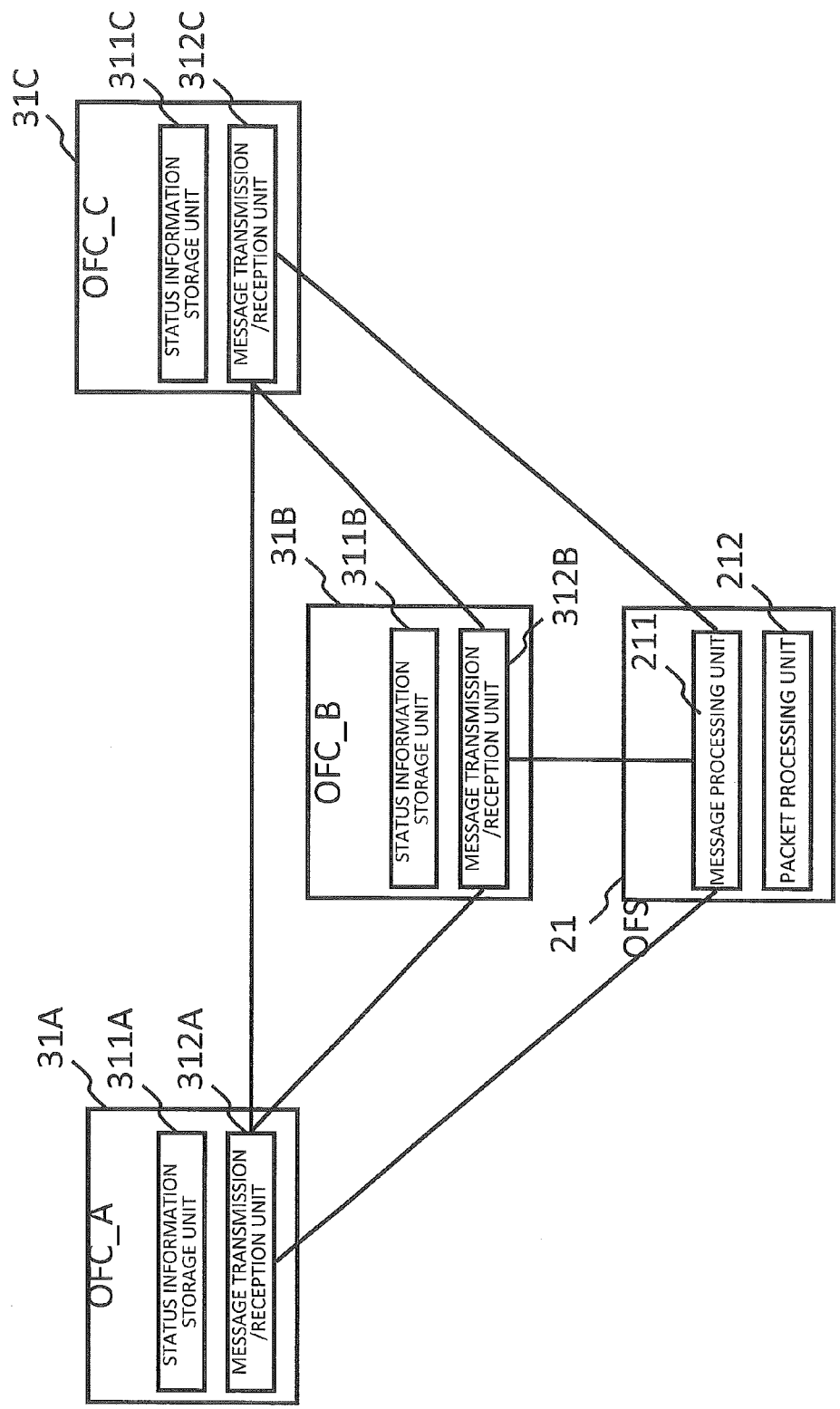
FIG. 4 is a block diagram illustrating a detailed configuration of each apparatus in the communication system of the first exemplary embodiment of the present disclosure.

FIG. 4 is a block diagram illustrating a detailed configuration of each apparatus shown in FIG. 3. With reference to FIG. 4, the OFC_A 31A comprises a status information storage unit 311A that stores operating states of the OFCs including itself, and a message transmission/reception unit 312A that transmits/receives synchronization messages including at least the operating state thereof to/from the other OFCs. Since the OFC_B 31B and the OFC_C 31C are configured identically to the OFC_A 31A, the explanation will be omitted.

The OFS 21 comprises a message processing unit 211 that forwards a synchronization message to the other OFCs when receiving the synchronization message from the OFCs 31A to 31C, and a packet processing unit 212 that processes a received packet according to a flow entry set by the OFCs 31A to 31C. Further, the message processing unit 211 also transmits/receives normal messages between the OFS and the OFCs such as a request (Packet-In) of setting a flow entry to an active (ACT) OFC, flow entry setting transmitted by an OFC, etc. Note that FIGS. 3 and 4 only show one OFS, however, a plurality of OFSs may be connected.

Further, the OFCs 31A to 31C and the OFS 21 can be realized by adding the message forwarding function to the OpenFlow controller and the OpenFlow switch described in Non-Patent Literatures 1 to 3.

Further, each unit (processing means) of the OFCs 31A to 31C and the OFS 21 shown in FIG. 4 can be realized by a computer program that has a computer that constitutes these apparatuses execute each processing described using the hardware thereof.

FIG. 5 is a drawing showing the configuration of the synchronization message exchanged between the OFCs 31A to 31C via the message processing unit 211 of the OFS 21. With reference to FIG. 5, a Vendor header and an OpenFlow header are added to a message main body.

FIG. 6 is a drawing for explaining the information in each header in FIG. 5. Version to Vendor fields of the OpenFlow header and the Vendor header are configured according to the Vendor-defined message described in the "5.5.4 Vendor" section on page 41 of Non-Patent Literature 3. In the present exemplary embodiment, an identifier indicating a message system is stored in a Type 1 field of the Vendor header, and a message identifier representing a message type is stored in a Type 2 field thereof. Further, in the message main body, a synchronization message body can be stored following the IP address of the source OFC and a layer-4 port number.

The message forwarding function via the OFS can be realized by using the synchronization message shown in FIGS. 5 and 6 without changing the basic configuration of OpenFlow in Non-Patent Literatures and 3. Messages configured differently can certainly be used without being limited to the example in FIGS. 5 and 6. For instance, in the example in FIGS. 5 and 6, the destination OFC is not specified and a message is forward to an OFC connected by the OFS, however, the source OFC may specify the destination OFC for a synchronization message.

Figure 7:
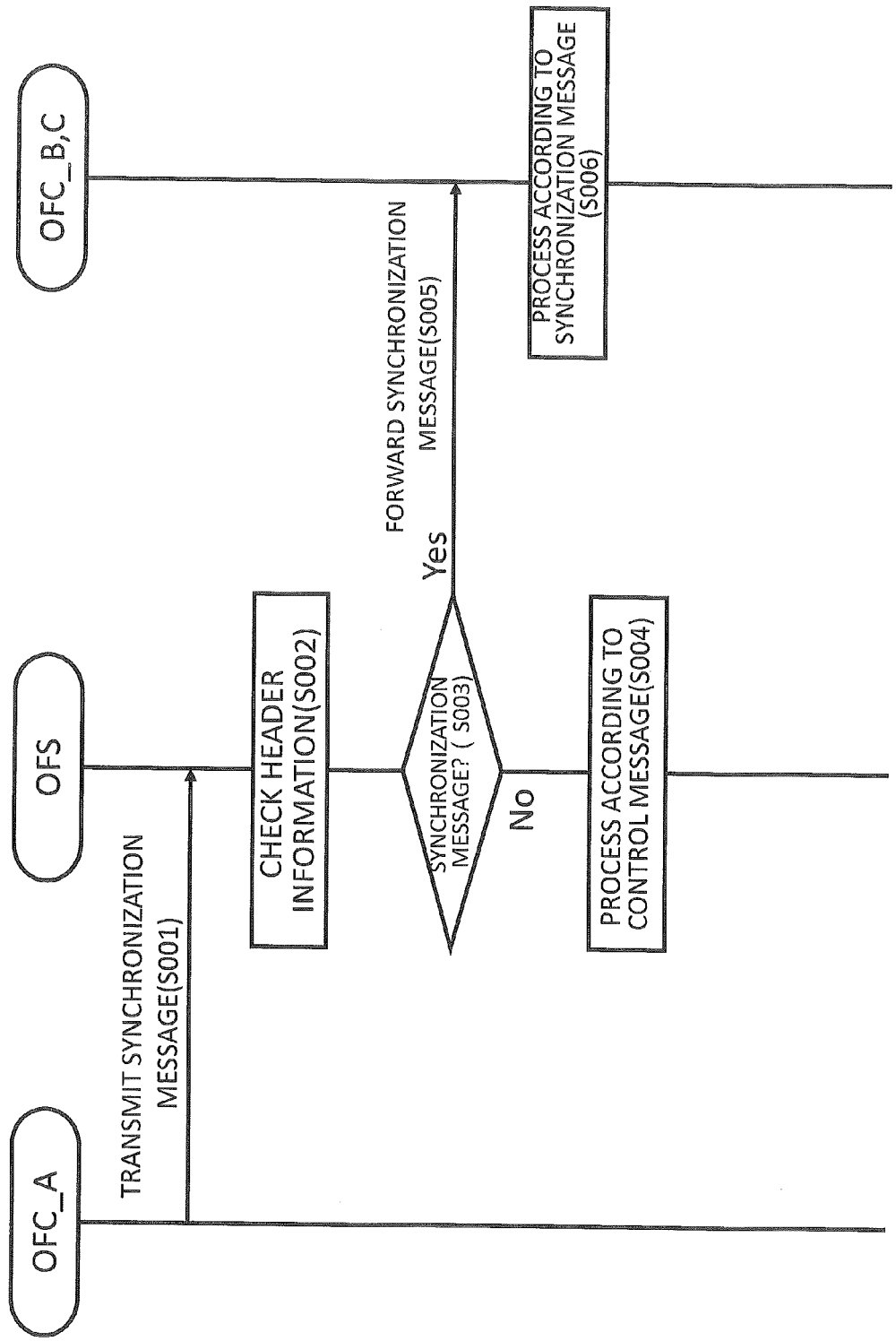
FIG. 7 is a sequence diagram showing the operation of the communication system of the first exemplary embodiment of the present disclosure.

Next, the operation of the present exemplary embodiment will be described in detail with reference to the drawings. FIG. 7 is a sequence diagram showing the operation of the communication system of the first exemplary embodiment of the present disclosure. When a predetermined condition is met, such as when a synchronization message cannot be transmitted over the management network due to a failure between the OFC_A 31A and the L2SW 11 in FIG. 3, the OFC_A 31A transmits a synchronization message to the OFS 21 (step S001).

Upon receiving the synchronization message, the OFS 21 checks the header information thereof (step S002). More concretely, the OFS 21 inspects whether or not the received message is a synchronization message to which the specific headers (especially Types 1 and 2 of the Vendor header) shown in FIGS. 5 and 6 are added.

When the result of the inspection indicates that the message is not a synchronization message but a normal control message (for instance Flow-mod, Packet-Out, etc.) (No in step S003), the OFS 21 performs processing according to the control message (step S004).

Meanwhile, when the result of the inspection confirms that the message is a synchronization message (Yes in the step S003), the OFS 21 forwards the synchronization message to the OFC_B 31B and OFC_C 31C (step S005). If the connections to the OFC_B 31B and OFC_C 31C have not been established at the time of the step S005, the OFS 21 may wait for the connections to the OFC_B 31B and OFC_C 31C to be established.

Upon receiving the synchronization message, the OFC_B 31B and OFC_C 31C updates the content of their own status information storage units 311B and 311C, respectively (step S006).

As described, according to the present exemplary embodiment, it becomes possible to exchange the status information between the OFCs 31A to 31C via the OFS 21 even when a failure occurs in the network connecting the OFCs 31A to 31C. The reason is the configuration in which the OFCs 31A to 31C transmit a synchronization message to the OFS 21, and the OFS 21, which has received the message, forwards the synchronization message to the OFCs 31B and 31C, the rest of the OFCs other than the OFC 31A, from which the synchronization message was received.

Exemplary Embodiment 2

Next, described will be a second exemplary embodiment, in which an active OFC is switched by interactively exchanging messages between the OFCs. Since the second exemplary embodiment of the present disclosure can be carried out in the same configuration as the first exemplary embodiment, the operational differences will be mainly described below. Further, in the explanation below, it is assumed that the switching order (priority order) of the OFCs has been determined to be the OFC_A 31A, the OFC_B 31B, and the OFC_C 31C.

Figure 8:
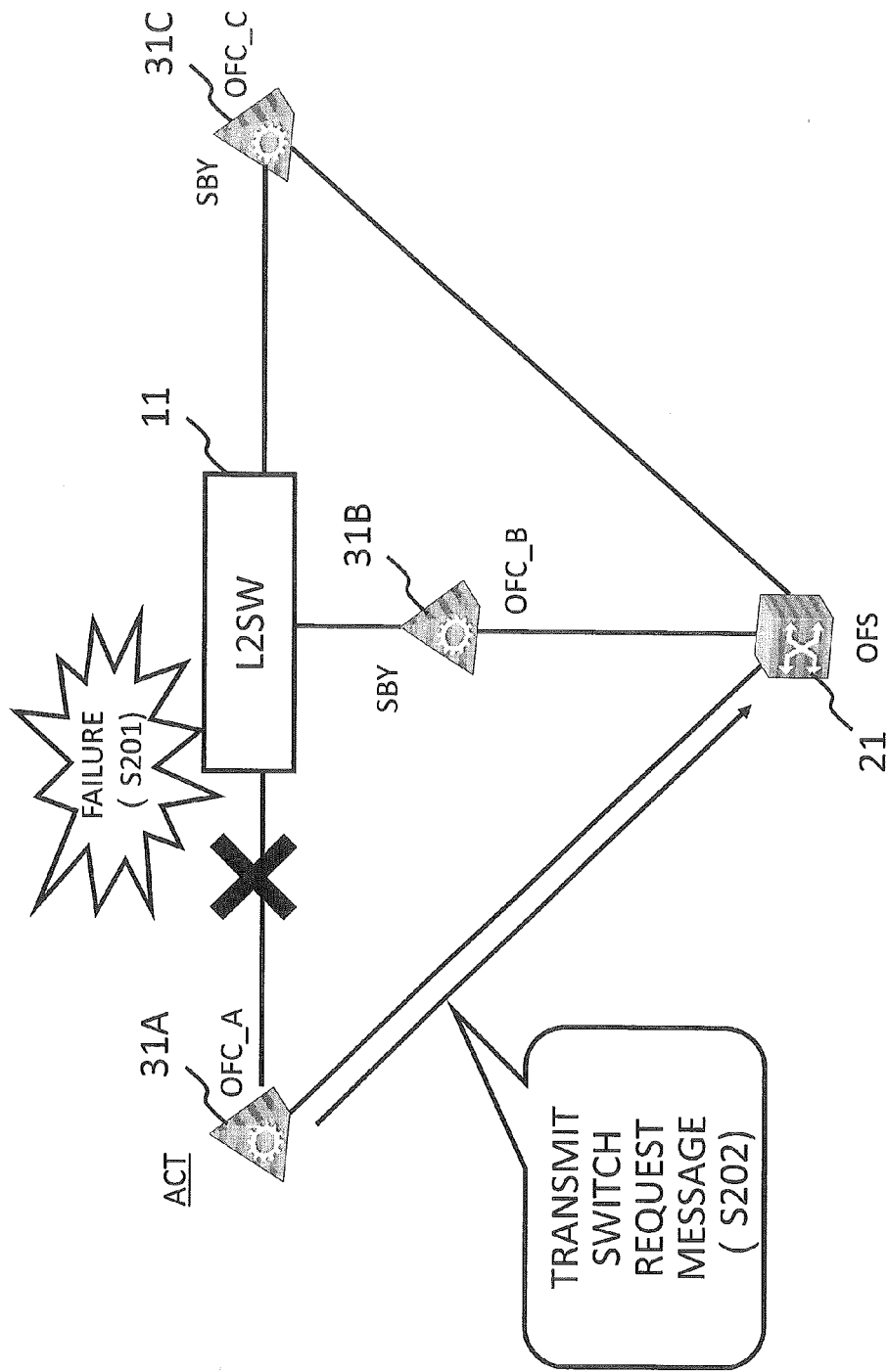
FIG. 8 is a drawing for explaining the operation of a communication system of a second exemplary embodiment of the present disclosure.

FIGS. 8 to 13 are drawings for explaining the operation of the second exemplary embodiment of the present disclosure. FIG. 8 shows a state in which a failure occurs between the OFC_A 31A operating as an active system (ACT) and the L2SW 11 in the same configuration as FIG. 3 (step S201). Upon detecting the failure, the OFC_A 31A transmits a switch request message to the OFS 21 (step S202). This switch request message is a request from the OFC_A 31A operating as an active system (ACT) to the other OFCs standing by to operate as an active system (ACT). Further, the switch request message can be configured similarly to the synchronization message shown in FIGS. 5 and 6 (the message body, and if necessary the Type 1 and Type 2 fields of the Vendor header are changed).

Figure 9:
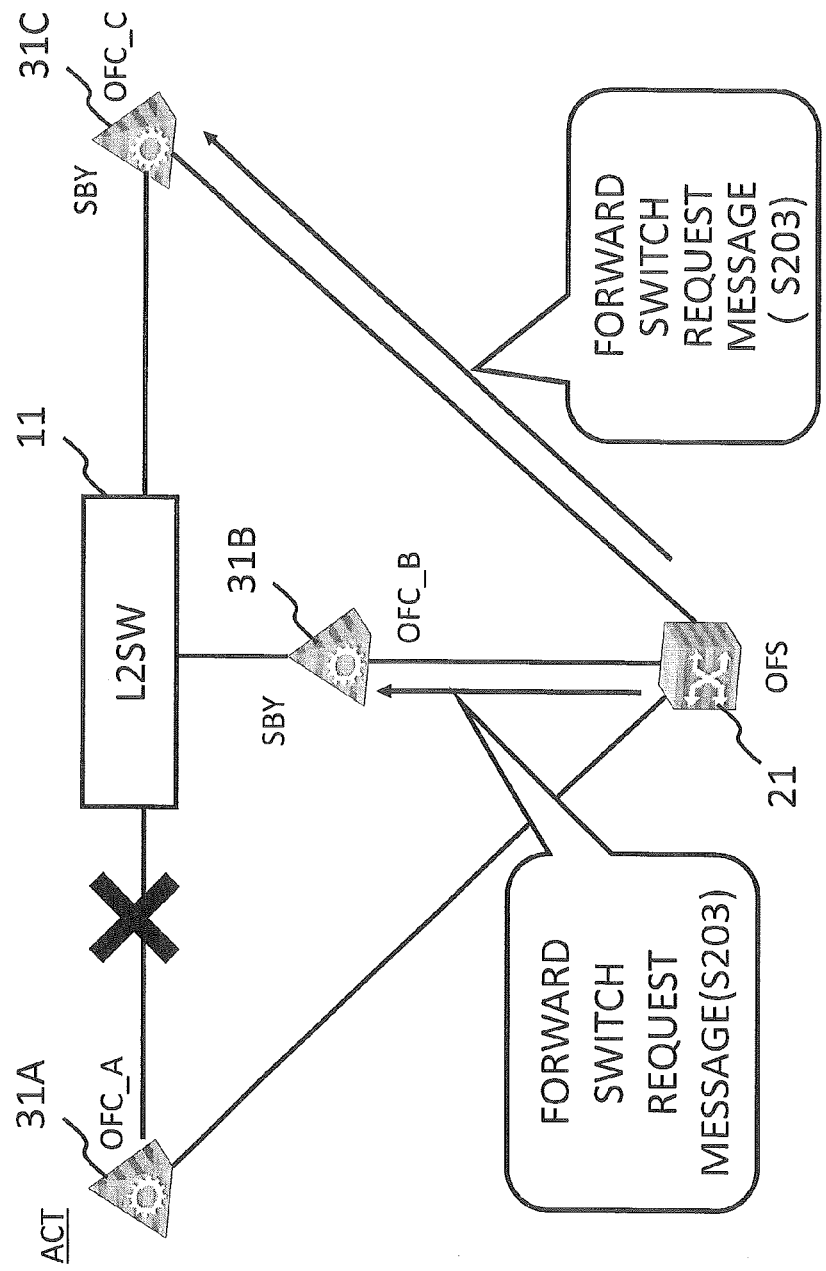
FIG. 9 is a continuation diagram of FIG. 8.

Having received the switch request message, the OFS 21 performs the same confirmation processing as the synchronization message confirmation in the first exemplary embodiment. When the message is confirmed to be a switch request message as a result of the confirmation, the OFS 21 forwards the switch request message to non-source OFCs, i.e., the OFC_B 31B and the OFC_C 31C, as shown in FIG. 9 (step S203).

Figure 10:
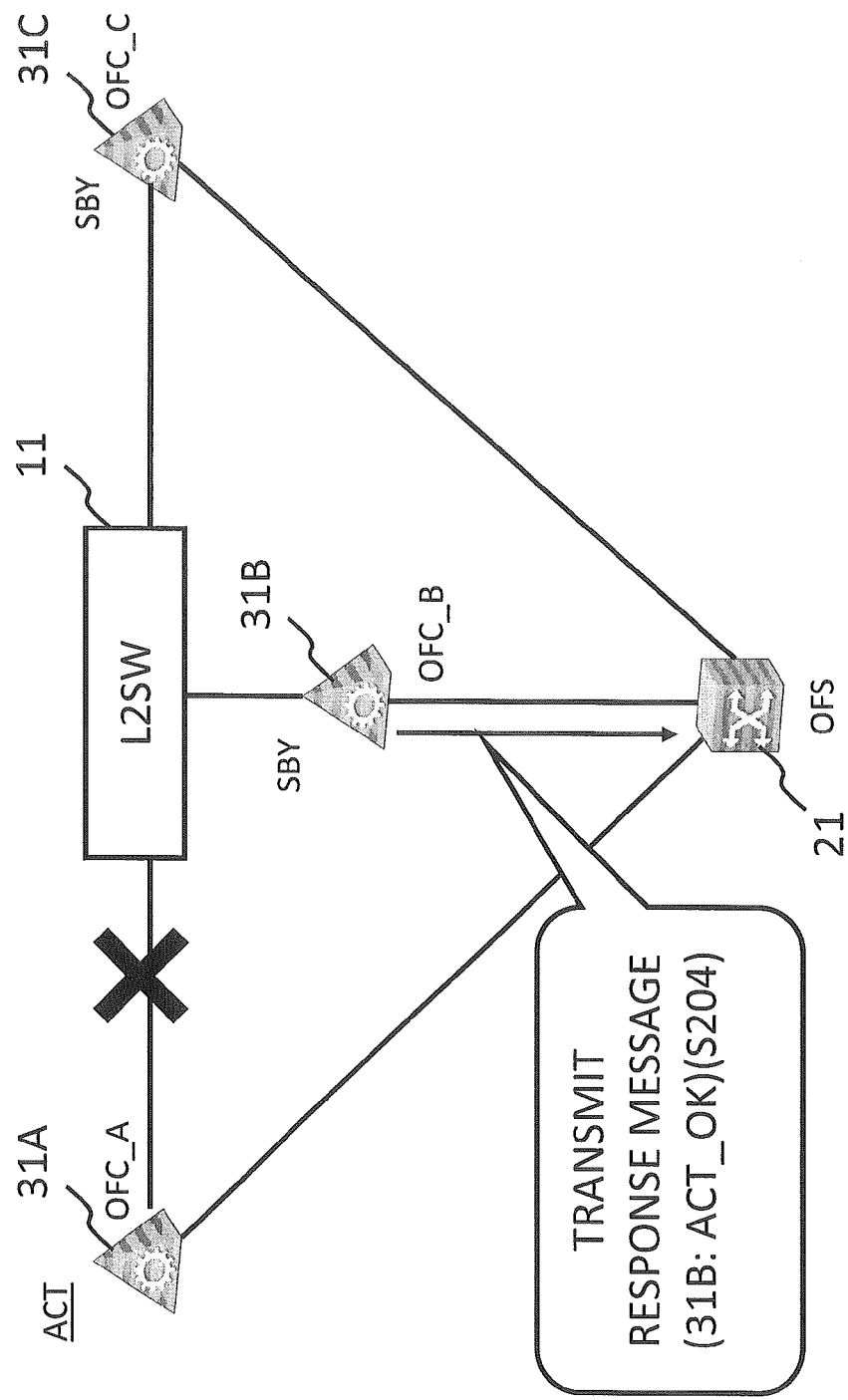
FIG. 10 is a continuation diagram of FIG. 9.

Upon receiving the switch request message, the OFC_B 31B acknowledges to be next in the switch order (priority order) and creates a response message (31B: ACT_OK) notifying the OFC_A 31A that it is able to operate as an active system (ACT). Since the management network is not working, the OFC_B 31B transmits the response message to the OFS 21, the source of the switch request message, as shown in FIG. 10 (step S204).

Figure 11:
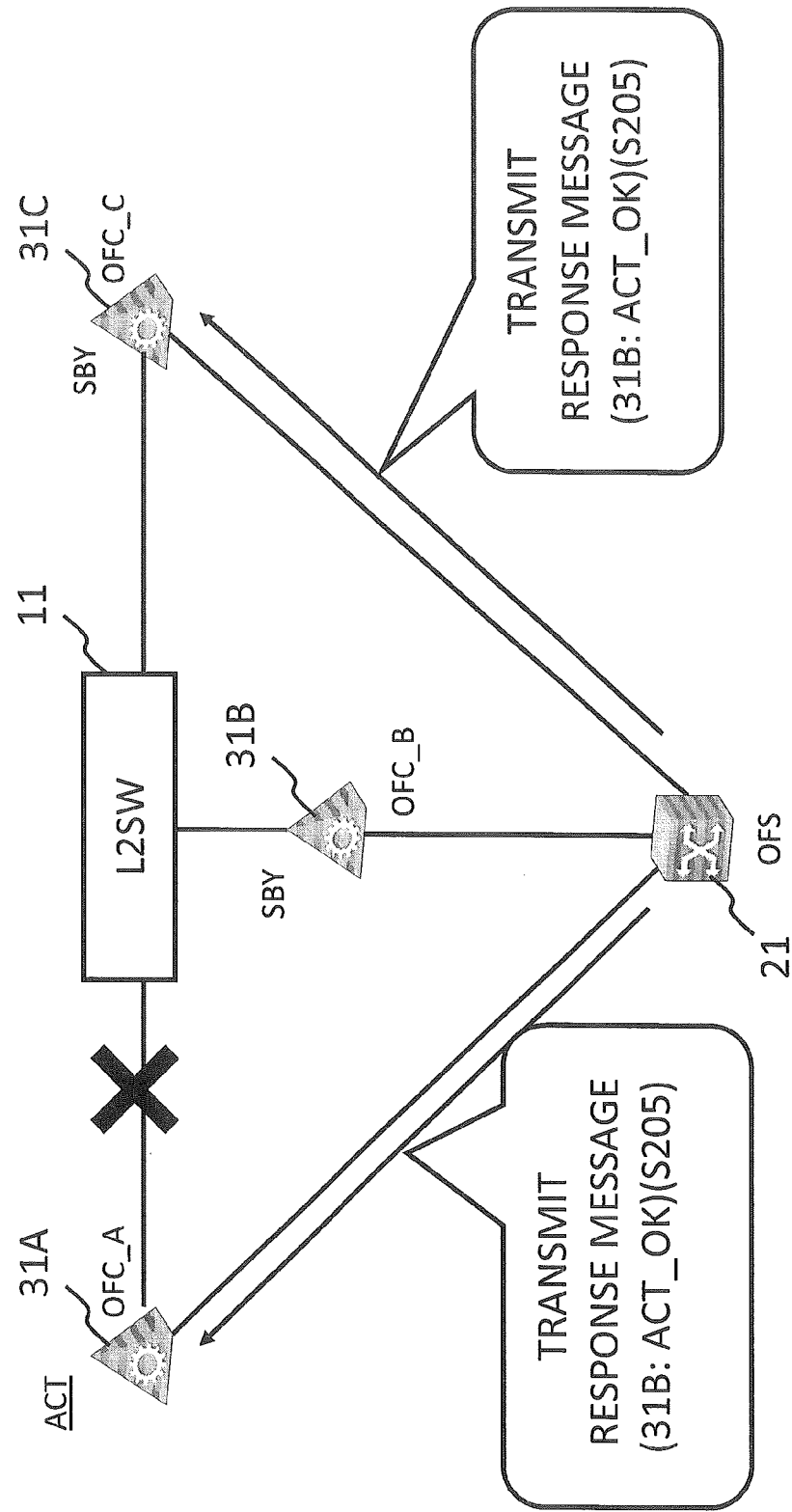
FIG. 11 is a continuation diagram of FIG. 10.

Having received the response message, the OFS 21 performs the same confirmation processing as the synchronization message confirmation in the first exemplary embodiment. When the message is confirmed to be a response message as a result of the confirmation, the OFS 21 forwards the response message to non-source OFCs, i.e., the OFC_A 31A and the OFC_C 31C, as shown in FIG. 11 (step S205).

Figure 12:
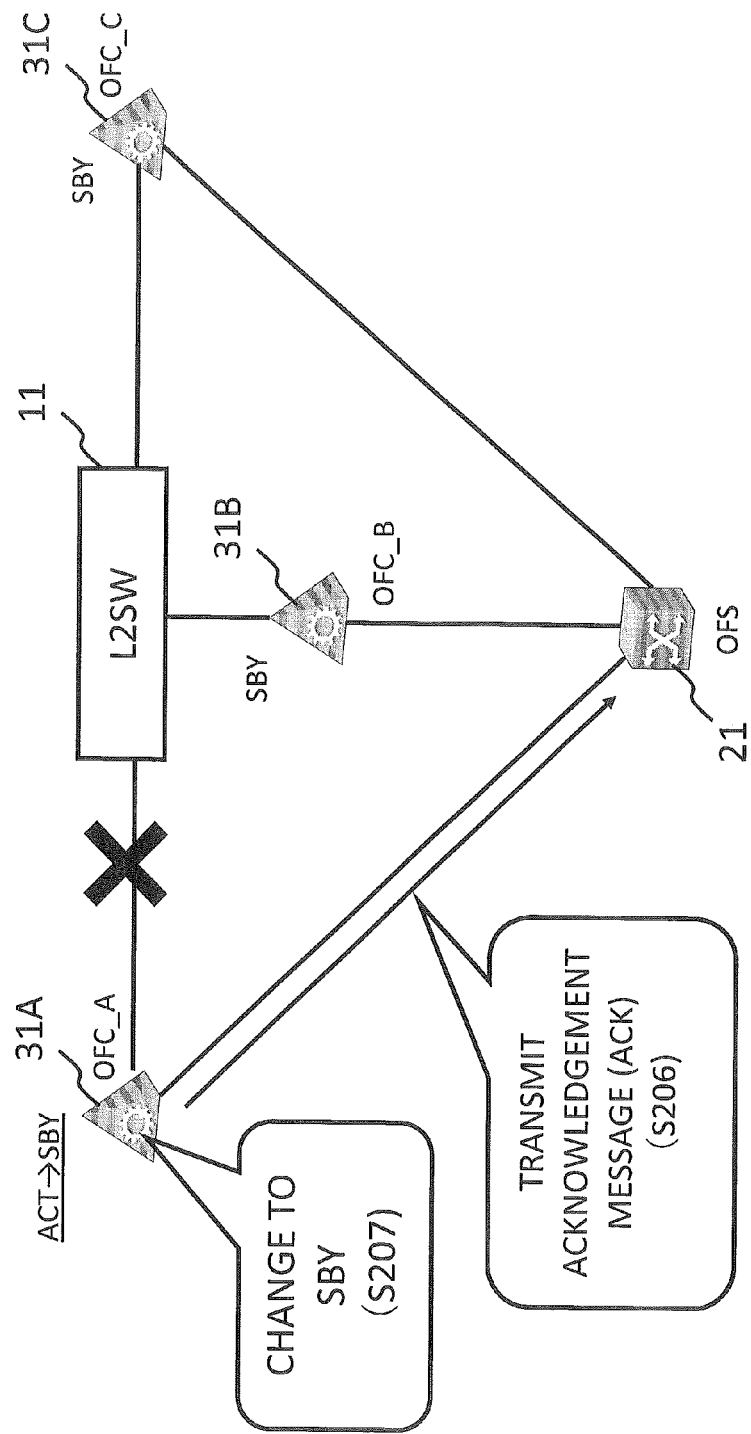
FIG. 12 is a continuation diagram of FIG. 11.

Upon receiving the response message, the OFC_A 31A confirms that the OFC_B 31B can replace it and operate as an active system (ACT), and then transmits an acknowledgment message to the OFS 21 as shown in FIG. 12 (step S206). Further, the OFC_A 31A switches the operation mode from active (ACT) to standby (SBY) (step S207).

Figure 13:
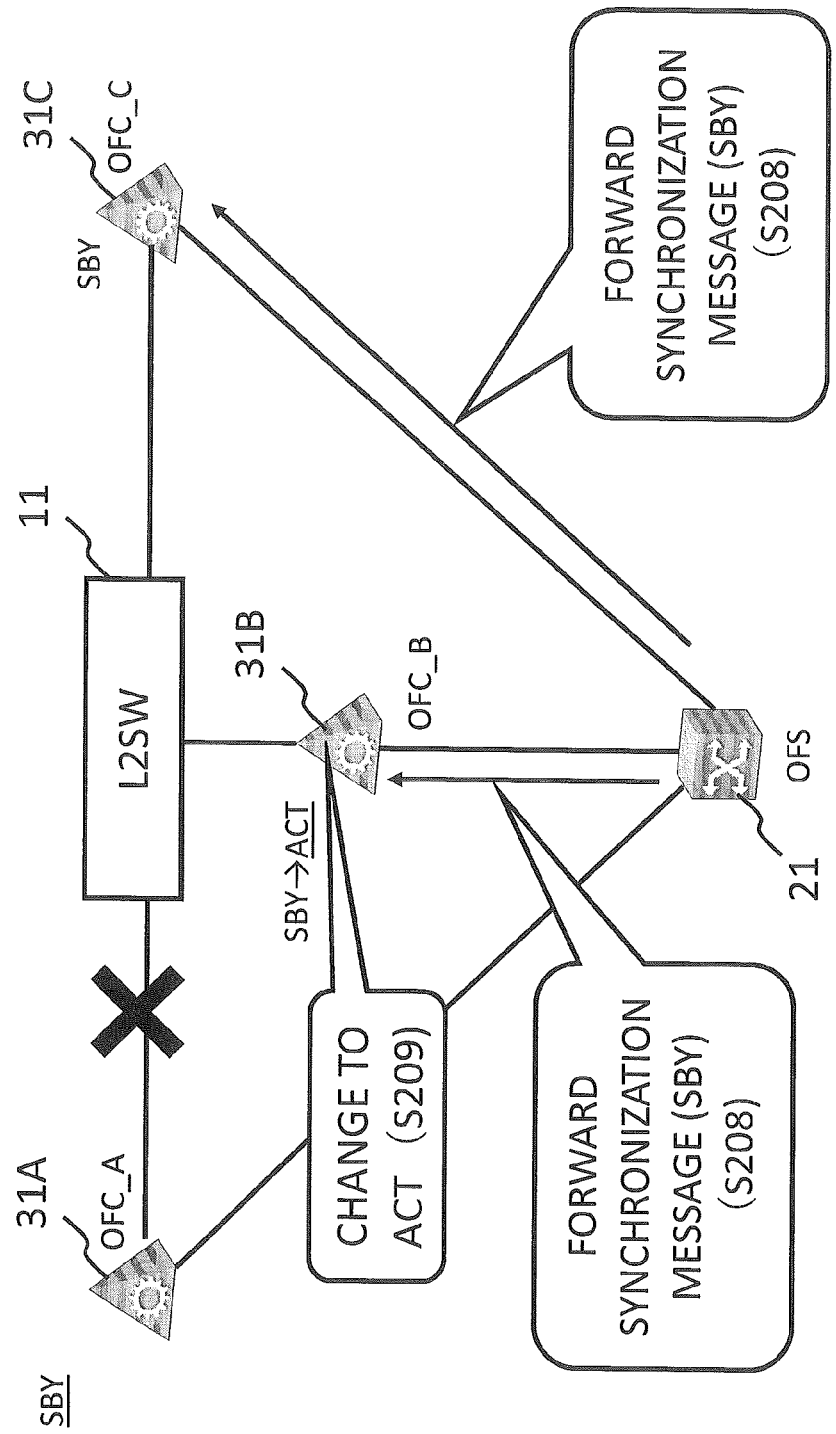
FIG. 13 is a continuation diagram of FIG. 12.

Having received the acknowledgment message (ACK), the OFS 21 performs the same confirmation processing as the synchronization message confirmation in the first exemplary embodiment. When the message is confirmed to be a acknowledgment message (ACK) as a result of the confirmation, the OFS 21 forwards the response message [acknowledgment message?] to non-source OFCs, i.e., the OFC_B 31B and the OFC_C 31C, as shown in FIG. 13 (step S208). Upon receiving the acknowledgment message (ACK), the OFC_B 31B switches the operation mode from standby (SBY) to active (ACT) (step S209). The OFC_B 31B operates as an active (ACT) OFC and controls the OFS 21 thereafter. Further, the OFCs 31A to 31C may exchange the synchronization message as in the first exemplary embodiment.

As described, the present disclosure can be applied not only to the transmission of synchronization messages, but also to the interactive message exchanges between OFCs. Further, the present disclosure can be applied to transmission/reception of information necessary for interoperation between the OFCs without having the information exchanged by OFCs limited to the switch request message.

The exemplary embodiments of the present disclosure have been described above, however, the present disclosure is not limited to the above exemplary embodiments and further modifications, replacements, and adjustments can be added within the scope of the basic technological concept of the present disclosure. For instance, the configurations in the exemplary embodiments above are based on OpenFlow of the Non-Patent Literatures 1 to 3, however, the present disclosure can be applied to any centralized control communication system having a similar mechanism.

Further, the exemplary embodiments above were explained using the OFS in Non-Patent Literatures 2 and 3 as an example of the communication apparatus, however, any non-OFS apparatus may be used as long as the apparatus can perform packet processing functions based on control information set by an OFC and the message forwarding function between OFCs described above. For instance, a mobile telephone terminal, smartphone, tablet terminal, personal computer, game device, and mobile router having a switch function that exchanges packets with built-in applications may be used.

Finally, preferred modes of the present disclosure will be summarized.
[Mode 1]
(Refer to the communication system according to the first aspect.)
[Mode 2]
In the communication system according to Mode 1, the information necessary for interoperation between the first and second control apparatuses is status information that indicates an operating status of the first control apparatus.
[Mode 3]
In the communication system according to Mode 1 or 2, the second control apparatus is a control apparatus that operates as a standby system to the first control apparatus and the second control apparatus starts to operate as an active system when receiving a message requesting a switch to a standby system from the first control apparatus via the communication apparatus.
[Mode 4]
In the communication system according to any one of Modes 1 to 3, the communication system is connected to the first and second control apparatuses via a management network and starts communication via the communication apparatus when a failure occurs in the management network.
[Mode 5]
In the communication system according to any one of Modes 1 to 4, a plurality of control apparatuses that operate as standby systems to the first control apparatus are connected, and a control apparatus ranked high in a predetermined priority order out of the plurality of control apparatuses starts to operate as an active system when receiving a message requesting a switch to a standby system from the first control apparatus via the communication apparatus.

[Mode 6]

(Refer to the first control apparatus according to the second aspect.)

[Mode 7]

(Refer to the second control apparatus according to the third aspect.)

[Mode 8]

(Refer to the communication apparatus according to the fourth aspect.)

[Mode 9]

(Refer to the information-relaying method according to the fifth aspect.)

[Modes 10 to 12]

(Refer to the program of each apparatus according to the sixth aspect.)

Note that Modes 6 to 12 can be developed into Modes 2 to 5 as Mode 1.

Further, each disclosure of Patent Literatures and Non-Patent Literatures listed above is incorporated herein by reference thereto. It should be noted that other objects, features and aspects of the present disclosure will become apparent in the entire disclosure and that modifications may be done without departing the gist and scope of the present disclosure as disclosed herein and claimed as appended herewith. Also it should be noted that any combination of the disclosed and/or claimed elements, matters and/or items may fall under the modifications aforementioned.

What is claimed is:

1. A communication system, including:
a communication apparatus that forwards a packet according to control information set by a control apparatus;
a first control apparatus that controls said communication apparatus by setting said control information in said communication apparatus; and
a second control apparatus that operates in concert with said first control apparatus,
said first control apparatus transmitting information necessary for interoperation between said first and second control apparatuses to said second control apparatus via said communication apparatus,
wherein said information necessary for interoperation between said first control apparatus and said second control apparatus includes information for performing synchronization between said first control apparatus and said second control apparatus,
wherein said communication apparatus is connected to each of said first control apparatus and said second control apparatus with a logical control channel such that the logical control channel for different control apparatuses is provided, and
wherein said control information is transmitted to said communication apparatus as a smaller size message than said information necessary for interoperation between said first control apparatus and said second control apparatus.

2. The communication system according to claim 1, wherein said information necessary for interoperation between said first and second control apparatuses comprises status information that indicates an operating status of said first control apparatus.

3. The communication system according to claim 2, wherein said second control apparatus comprises a control apparatus that operates as a standby system to said first control apparatus, and said second control apparatus starts to operate as an active system when receiving a message requesting a switch to a standby system from said first control apparatus via said communication apparatus.

4. The communication system according to claim 2 connected to said first and second control apparatuses via a management network, and starting communication via said communication apparatus when a failure occurs in said management network.

5. The communication system according to claim 2, wherein a plurality of control apparatuses that operate as standby systems to said first control apparatus are connected, and a control apparatus ranked high in a predetermined priority order out of said plurality of control apparatuses starts to operate as an active system when receiving a message requesting a switch to a standby system from said first control apparatus via said communication apparatus.

6. The communication system according to claim 1, wherein said second control apparatus comprises a control apparatus that operates as a standby system to said first control apparatus, and said second control apparatus starts to operate as an active system when receiving a message requesting a switch to a standby system from said first control apparatus via said communication apparatus.

7. The communication system according to claim 6 connected to said first and second control apparatuses via a management network, and starting communication via said communication apparatus when a failure occurs in said management network.

8. The communication system according to claim 6, wherein a plurality of control apparatuses that operate as standby systems to said first control apparatus are connected, and a control apparatus ranked high in a predetermined priority order out of said plurality of control apparatuses starts to operate as an active system when receiving a message requesting a switch to a standby system from said first control apparatus via said communication apparatus.

9. The communication system according to claim 1 connected to said first and second control apparatuses via a management network, and starting communication via said communication apparatus when a failure occurs in said management network.

10. The communication system according to claim 9, wherein a plurality of control apparatuses that operate as standby systems to said first control apparatus are connected, and a control apparatus ranked high in a predetermined priority order out of said plurality of control apparatuses starts to operate as an active system when receiving a message requesting a switch to a standby system from said first control apparatus via said communication apparatus.

11. The communication system according to claim 1, wherein a plurality of control apparatuses that operate as standby systems to said first control apparatus are connected, and a control apparatus ranked high in a predetermined priority order out of said plurality of control apparatuses starts to operate as an active system when receiving a message requesting a switch to a standby system from said first control apparatus via said communication apparatus.

12. The communication system according to claim 1, wherein the communication apparatus comprises a forwarding element, the information necessary for the interoperation between said first and second control apparatuses being exchanged via the forwarding element.

13. The communication system according to claim 1, wherein the communication apparatus comprises a switch, the information necessary for the interoperation between said first and second control apparatuses being exchanged via the switch.

14. The communication system according to claim 1, wherein the communication apparatus comprises a router, the information necessary for the interoperation between said first and second control apparatuses being exchanged via the router.

15. The communication system according to claim 1, wherein said information necessary for interoperation between said first and second control apparatuses comprises status information indicating that said first control apparatus is active and operating.

16. The communication system according to claim 1, wherein the smaller size message, which is different from the information necessary for interoperation between said first control apparatus and said second control apparatus, is exchanged between said first control apparatus, said communication apparatus, and said second control apparatus.

17. A first control apparatus connected to a network including a communication apparatus that forwards a packet according to control information set by a control apparatus, said first control apparatus comprising:
   a control unit controlling said communication apparatus by setting said control information in said communication apparatus; and
   an information transmission unit transmitting information necessary for interoperation with a second control apparatus to said second control apparatus that operates in concert therewith via said communication apparatus,
   wherein said information necessary for interoperation between said first control apparatus and said second control apparatus includes information for performing synchronization between said first control apparatus and said second control apparatus,
   wherein said communication apparatus is connected to each of said first control apparatus and said second control apparatus with a logical control channel such that the logical control channel for different control apparatuses is provided, and
   wherein said control information is transmitted to said communication apparatus as a smaller size message than said information necessary for interoperation between said first control apparatus and said second control apparatus.

18. A second control apparatus connected to a network, the second control apparatus including:
   a communication apparatus that forwards a packet according to control information set by a control apparatus; and
   a first control apparatus that controls said communication apparatus by setting said control information in said communication apparatus, said second control apparatus comprising:
   a control unit controlling said communication apparatus by setting said control information in said communication apparatus; and
   an information receiving unit receiving information necessary for interoperation with said first control apparatus from said first control apparatus via said communication apparatus, and operating in concert with said first control apparatus,
   wherein said information necessary for interoperation between said first control apparatus and said second control apparatus includes information for performing synchronization between said first control apparatus and said second control apparatus,
   wherein said communication apparatus is connected to each of said first control apparatus and said second control apparatus with a logical control channel such that the logical control channel for different control apparatuses is provided, and
   wherein said control information is transmitted to said communication apparatus as a smaller size message than said information necessary for interoperation between said first control apparatus and said second control apparatus.

19. A communication apparatus, comprising:
   a first unit receiving information necessary for interoperation between a plurality of control apparatuses from a control apparatus out of said plurality of control apparatuses that control said communication apparatus by setting control information in said communication apparatus; and
   a second unit transmitting information necessary for interoperation between said plurality of control apparatuses to the remaining control apparatuses of said plurality of control apparatuses,
   said communication apparatus forwarding a packet according to the control information set by the control apparatus,
   wherein said information necessary for interoperation between a first control apparatus and a second control apparatus of said plurality of control apparatuses includes information for performing synchronization between said first control apparatus and said second control apparatus,
   wherein said communication apparatus is connected to each of said first control apparatus and said second control apparatus with a logical control channel such that the logical control channel for different control apparatuses is provided, and
   wherein said control information is transmitted to said communication apparatus as a smaller size message than said information necessary for interoperation between said first control apparatus and said second control apparatus.

20. An information-relaying method in a network including:
   a communication apparatus that forwards a packet according to control information set by a control apparatus;
   a first control apparatus that controls said communication apparatus by setting said control information in said communication apparatus; and
   a second control apparatus that operates in concert with said first control apparatus, said information-relaying method including:
   causing said communication apparatus to receive information necessary for interoperation between said first and second control apparatuses from said first control apparatus; and
   causing said communication apparatus to forward said information necessary for interoperation between said first and second control apparatuses to said second control apparatus,
   wherein said information necessary for interoperation between said first control apparatus and said second control apparatus includes information for performing synchronization between said first control apparatus and said second control apparatus,
   wherein said communication apparatus is connected to each of said first control apparatus and said second control apparatus with a logical control channel such that the logical control channel for different control apparatuses is provided, and
   wherein said control information is transmitted to said communication apparatus as a smaller size message than said information necessary for interoperation between said first control apparatus and said second control apparatus.

\* \* \* \* \*